United States Patent [19]
Calvert

[11] Patent Number: 4,883,262
[45] Date of Patent: Nov. 28, 1989

[54] DEVICE CONTAINING A FORCE-IMPARTING MEANS AND EQUIPPED WITH SAFETY MEANS

[75] Inventor: Michael A. Calvert, Kirkcaldy, Great Britain

[73] Assignee: Prime Actuator Control Systems Limited, Glenrothes, Great Britain

[21] Appl. No.: 126,110

[22] PCT Filed: Mar. 30, 1987

[86] PCT No.: PCT/GB87/00214
§ 371 Date: Feb. 1, 1988
§ 102(e) Date: Feb. 1, 1988

[87] PCT Pub. No.: WO87/05986
PCT Pub. Date: Oct. 8, 1987

[30] Foreign Application Priority Data
Apr. 1, 1986 [GB] United Kingdom ............... 8607879

[51] Int. Cl.⁴ .................... F16P 3/08; F10J 13/24
[52] U.S. Cl. ......................... 267/175; 267/75; 267/176; 272/68; 272/138
[58] Field of Search ............... 267/291, 75, 174, 175, 267/176, 177, 248, 249, 179; 92/128, 130 C; 272/135, 138, 142, 143

[56] References Cited
U.S. PATENT DOCUMENTS

| | | | |
|---|---|---|---|
| 3,132,861 | 5/1964 | Horney | 272/68 |
| 3,462,137 | 8/1969 | Grube | 267/177 X |
| 3,613,520 | 10/1971 | Wordon | 267/175 X |
| 3,784,195 | 1/1974 | Johnson | 272/138 |
| 4,291,787 | 9/1981 | Brentham | 188/318 |
| 4,469,016 | 9/1984 | Butler | 92/128 |

FOREIGN PATENT DOCUMENTS

| | | |
|---|---|---|
| 900783 | 3/1953 | Fed. Rep. of Germany . |
| 2365727 | 3/1978 | France . |
| 2402572 | 4/1979 | France . |

Primary Examiner—Andres Kashnikow
Assistant Examiner—Matthew C. Graham
Attorney, Agent, or Firm—Mason, Fenwick & Lawrence

[57] ABSTRACT

A spring-containing device comprises a housing including a removable end plate (2). A plurality of screw-threaded tie rods (7) have nuts (28) holding the end plate (2) in assembly in the housing. A safety plate (14) is disposed within the housing at a fixed spacing from the end plate (2) but short of a movable spring-retaining plate (8) at its closes approach to the end plate (2). The safety plate (14) is fast on a shaft (15) rotatable in the end plate (2) and adapted (at 16) to be turned from outside. The safety plate (14) has keyhole-shaped openings through which the respective tie rods (7) extend and the tie rod (7) have safety collars (18) which can only pass through the keyhole-shaped openings when the safety plate (14) is in a certain angular position.

4 Claims, 2 Drawing Sheets

DEVICE CONTAINING A FORCE-IMPARTING MEANS AND EQUIPPED WITH SAFETY MEANS

This invention relates to a device containing a force-imparting means and equipped with safety means.

The object of the invention is to afford protection against uncontrolled release of forces on dismantling the device.

According to the invention there is provided a device comprising a housing including a removable end plate, means for imparting a force and captive within the housing between the end plate and movable retaining means biased by the force imparting means, a plurality of screw-threaded tie rods and nuts holding the end plate in assembly in the housing, and safety means comprising a safety plate within the housing at a fixed spacing from the end plate but short of the retaining means at the closest approach of the retaining means to the end plate, the safety plate being fast on a shaft rotatable in the end plate and adapted to be turned from outside the housing, the safety plate having keyhole-shaped openings through which the respective tie rods extend and the tie rods each having a safety collar which in one angular position of the safety plate can pass through the respective keyhole-shaped opening but in another angular position of the safety plate cannot pass through the keyhole-shaped opening.

An embodiment of the invention will now be described, by way of example, with reference to the accompanying drawing, in which.

Figure 1:
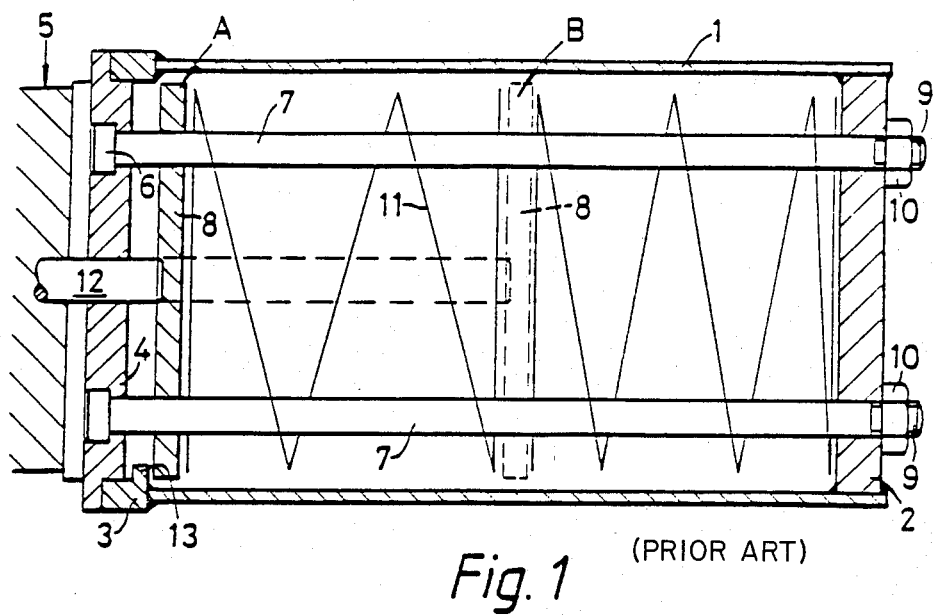
FIG. 1 is an axial sectional view of a typical spring-containing device, the upper half of the figure showing an arrangement wherein there is no provision for the spring to "bottom-out" on dismantling the device and the lower half of the figure showing an arrangement wherein there is provision for the spring to "bottom-out" on dismantling the device.

In FIG. 1 a typical spring-containing device comprises a housing which in turn comprises a cylindrical casing 1 to one end of which an end plate 2 is welded. A ring 3 is welded to the other end of the casing 1 and the ring 3 seats on a plate 4 secured to a main unit generally indicated by reference numeral 5. Enlarged heads 6 of the tie rods 7 are captive within recesses in the plate 4 and the tie rods extend through openings in a movable spring-retaining plate 8 and the end plate 2. The tie rods 7 terminate in screw-threaded portions 9 receiving nuts 10. A force-imparting means in the form of a compression spring 11 is captive within the housing between the end plate 2 and the plate 8 which is movable between positions A and B. A movable rod 12 of the main unit 5 is biased by the spring 11 via the plate 8.

In the case of the top part of FIG. 1 it will be seen that when the nuts 10 are removed any force remaining in the spring 11 is free to be released since the spring 11 does not "bottom-out" on the ring 3. In the case of the bottom part of FIG. 1, however, it will be seen that when the nuts 10 are removed the spring 11 "bottoms-out" on the lip 13 of the ring 3 so that any spring forces are held captive. However, there is still the risk of an uncontrolled release of spring force particularly if the nuts 10 are removed when the plate 8 is in any position other than position A because of a force applied by the rod 12.

Figure 2:
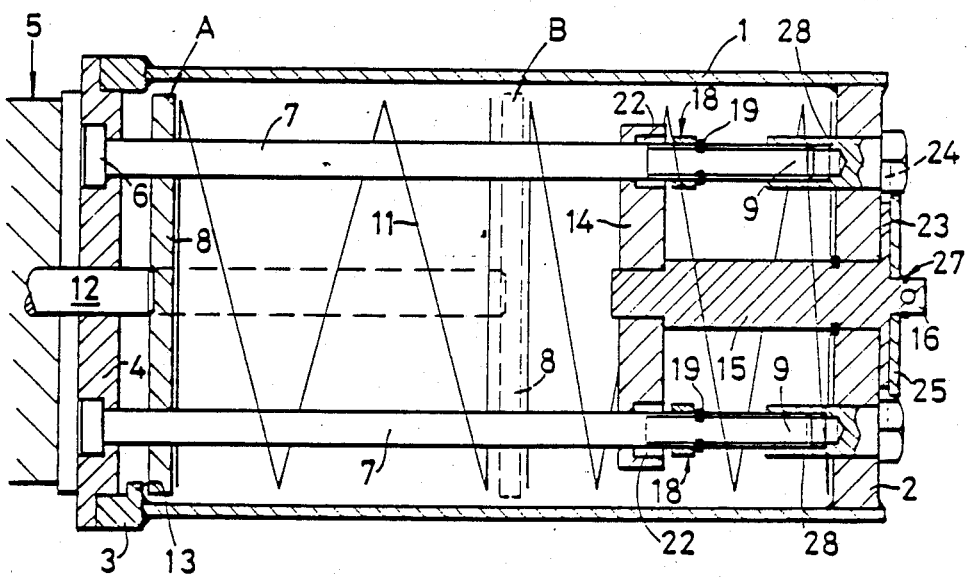
FIG. 2 is similar to FIG. 1 except that the device is equipped with safety means.
Figure 3:
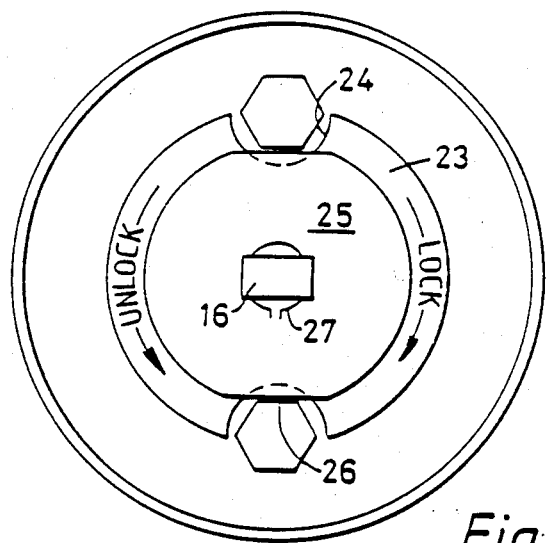
FIG. 3 is an end view from the right hand side of the device in FIG. 2.
Figure 4:
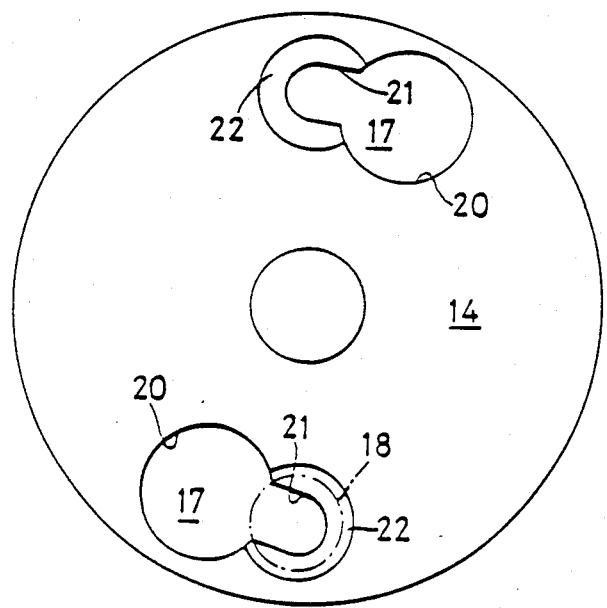
FIG. 4 is a somewhat enlarged view of a part of the safety means in FIG. 2.

FIG. 2 is similar to FIG. 1 except that the device is equipped with safety means which comprise a safety plate 14 within the housing at a fixed spacing from the end plate 2 but short of the plate 8 in position B. The plate 14 is fast on a shaft 15 rotatable in the plate 2 and adapted to be turned from outside the housing at 16 where a rectangular end is provided. The plate 14 has keyhole-shaped openings 17 through which the respective tie rods extend. Each tie rod 7 has a safety collar 18 screwed thereon and retained by a circlip 19. Each keyhole-shaped opening 17 has a wide portion 20 and a narrow portion 21 which extends from a recess 22. The narrow portion 21 can slidably receive the tie rod 7 but not the collar 18 and the wide portion 20 and the recess 22 can slidably receive the collar 18. The shaft 15 has a flange 23 which lies against the outer side of the plate 2 and has recesses 24 in its peripheral edge. A lock plate 25 with flats 26 is removably attached on the end 16 by means of a circlip 27. A further difference resides in the use of cap nuts 28 instead of the nuts 10 in FIG. 1. However, the nuts 10 could be used in FIG. 2 with slightly longer tie rods 7.

When the device in FIG. 2 is properly assembled the nuts 28 (or 10) are received within the recesses 24 and the lock plate 25 has its flats 26 preventing the turning of the nuts. In order to dismantle the device it is first necessary to remove the circlip 27 and then the lock plate 25. Thereafter, the nuts 28 (or 10) are removed and if there is no residual spring force remaining in the spring 11 the collars 18 will not seat in the recesses 22. Thus there will be no resistance to turning the shaft 15, the flange 23 and the safety plate 14 so as to align the wide portion 20 of the openings 17 with the collars 18, whereupon dismantling can be completed.

If, however, there is a residual spring force remaining in the spring 11 after the nuts 28 (or 10) are removed, the collars 18 will seat in the recesses 22. This will be apparent when attempting to turn the shaft 15, the flange 23 and the safety plate 14 in order to complete the dismantling since the collars 18 are too large to permit them to leave the recesses 22 in a lateral direction. In this case, further dismantling requires the end plate 2 to be pushed back a little so as to unseat the collars 18 from the recesses 22 and permit the collars 18 to be aligned with the wide portions 20 of the openings 17.

Conversely, when re-assembling the device the safety plate 14 must be initially in its unlocked position so that the collars 18 can pass through the wide portions 20 of the openings 17. However, in this position the flange 23 prevents the application of the nuts 28 (or 10) to the screw-threaded portions 9 of the tie rods 7. Thus, once the collars 18 have passed through the wide portions 20 of the openings 17 the shaft 15, the flange 23 and the safety place 14 are turned to the locked position. In this position the collars 18 can be allowed to seat in the recesses 22 with any spring forces held captive preparatory to further assembly. Also in this position the recesses 24 permit the nuts 28 (or 10) to be applied. When the nuts are fully tightened the collars 18 are no longer seated in the recesses 22 and finally the locking plate 25 is applied using the circlip 27. The lock plate 25 may be replaced by any suitable locking device to prevent inadvertent loosening of the nuts 28 (or 10).

Instead of a mechanical spring, the force-imparting means may be pneumatic, hydraulic, electrical and magnetic.

I claim:

1. A device comprising a housing including an end plate, means for imparting a force and captive within the housing between the end plate and removable retaining means biased by the force imparting means, a plurality of screw-threaded tie rods and nuts holding the end plate in assembly in the housing, and safety means comprising a safety plate within the housing at a fixed spacing from the end plate, but short of the retaining means at the closest approach of the retaining means to the end-plate, the safety plate being fast on a shaft rotatable in the end plate and adapted to be turned from outside the housing, the safety plate having keyhole-shaped openings through which the respective tie rods extend and the tie rods each having a safety collar which in one angular position of the safety plate can pass through the respective keyhole-shaped opening but in another angular position of the safety plate cannot pass through the keyhole-shaped opening.

2. A device according to claim 1, wherein each keyhole-shaped opening has a wide portion through which the collar can pass and a narrow portion which extends from a recess which can slidably receive the collar but from which recess the collar cannot be removed in a lateral direction.

3. A device according to claim 1, wherein the shaft has fast thereon a flange, which lies against the outer side of the end plate and has recesses in its peripheral edge, which are so disposed relative to the respective keyhole-shaped openings that only when the safety plate is in its other angular position the nuts can be removed from and applied to the screw-threaded tie rods.

4. A device according to claim 2, wherein the shaft has fast thereon a flange, which lies against the outer side of the end plate and has recesses in its peripheral edge, which recesses are so disposed relative to the respective keyhole-shaped openings that only when the safety plate is in its other angular position the nuts can be removed from and applied to the screw-threaded tie rods.

* * * * *